(12) United States Patent
Thirumalai et al.

(10) Patent No.: US 8,739,154 B2
(45) Date of Patent: May 27, 2014

(54) METHOD AND SYSTEM FOR IMPLEMENTING PERFORMANCE KITS

(75) Inventors: Govindarajan Thirumalai, Bangalore (IN); Praveen Arora, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1000 days.

(21) Appl. No.: 12/258,160

(22) Filed: Oct. 24, 2008

(65) Prior Publication Data

US 2010/0107151 A1   Apr. 29, 2010

(51) Int. Cl.
*G06F 9/445* (2006.01)
(52) U.S. Cl.
USPC ............................ 717/172; 717/173; 717/178
(58) Field of Classification Search
USPC .................................. 717/100–120, 168–178
See application file for complete search history.

(56) References Cited

U.S. PATENT DOCUMENTS

| 7,103,874 | B2 * | 9/2006 | McCollum et al. ............ 717/121 |
| 7,490,319 | B2 * | 2/2009 | Blackwell et al. ............. 717/124 |
| 2008/0201705 | A1 * | 8/2008 | Wookey ........................ 717/175 |
| 2008/0250121 | A1 | 10/2008 | Thirumalai | |

OTHER PUBLICATIONS

Carsten Binnig et al., "Testing Database Applications", SIGMOD, Jun. 2006, pp. 739-741, Chicago, IL, US.
Jefferey Voas, "An Approach to Certifying Off-the-Shelf Software Components", pp. 1-13, Sterling, VA, US.
Johan Moe et al., "Understanding Distributed Systems via Execution Trace Data", The proceedings of the Ninth International Workshop on Program Comprehension, May 2001, pp. 1-8, Toronto Canada.
Willaim M. McKeeman, "Differential Testing for Software", Digital Technical Journal, 1998, pp. 100-107, vol. 10, No. 1.
Grigori Melnik et al., "Executable Acceptance Tests for Communicating Business Requirements: Customer Perspective".
John Grundy et al., "Deployed Software Component Testing Using Dynamic Validation Agents", Journal of Systems and Software, 2004, pp. 1-11, Department of Computer Science and Department of Electrical and Electronic Engineering, University of Auckland, Auckland, New Zealand.
Joseph R. Horgan et al., "Software Testing and Reliability", Emerging Techniques, pp. 531-566. Chapter 13.
Ye Wu et al., "UML-Based Integration Testing for Component-Based Software", Information and Software Enfineering Department George Mason University, Fairfax, VA, US.
Sunita Chulani et al., Modeling Software Defect Instruction and Removal: COQUALMO (COnstructive QUALity MOdel), USC-CSE, 1999, pp. 1-11, USC-Center for Software Engineering, Los Angeles, CA, US.
Lisa Crispin et al., "The Need for Speed: Automating Acceptance Testing in an Extreme Programming Environment", pp. 96-104.
Jose Garcia-Franjul et al., "Generating Test Cases Specifications for BPEL Compositions of Web Services Using SPIN", International Workshop on Web Services Modeling and Testing, Jun. 2006, pp. 83-94, Palermo, Sicily.
Cordell Vail, "Stress, Load, Volume, Performance, Benchmark and Base Line Testing Tool Evaluation and Comparison", 2005, pp. 1-213.
Antonia Bertolino, "Software Testing", SWEBOK, IEEE, May 2001, pp. 69-86.

* cited by examiner

*Primary Examiner* — Chuck Kendall
(74) *Attorney, Agent, or Firm* — Vista IP Law Group, LLP

(57) ABSTRACT

Described is an improved method, system, and computer program product for implementing performance kits. Test data for the performance kit is preloaded into an installation image that is distributed with a vendor's product. This avoids the need for the customer himself to have to perform the tasks of installing the test data at the customer site.

32 Claims, 15 Drawing Sheets

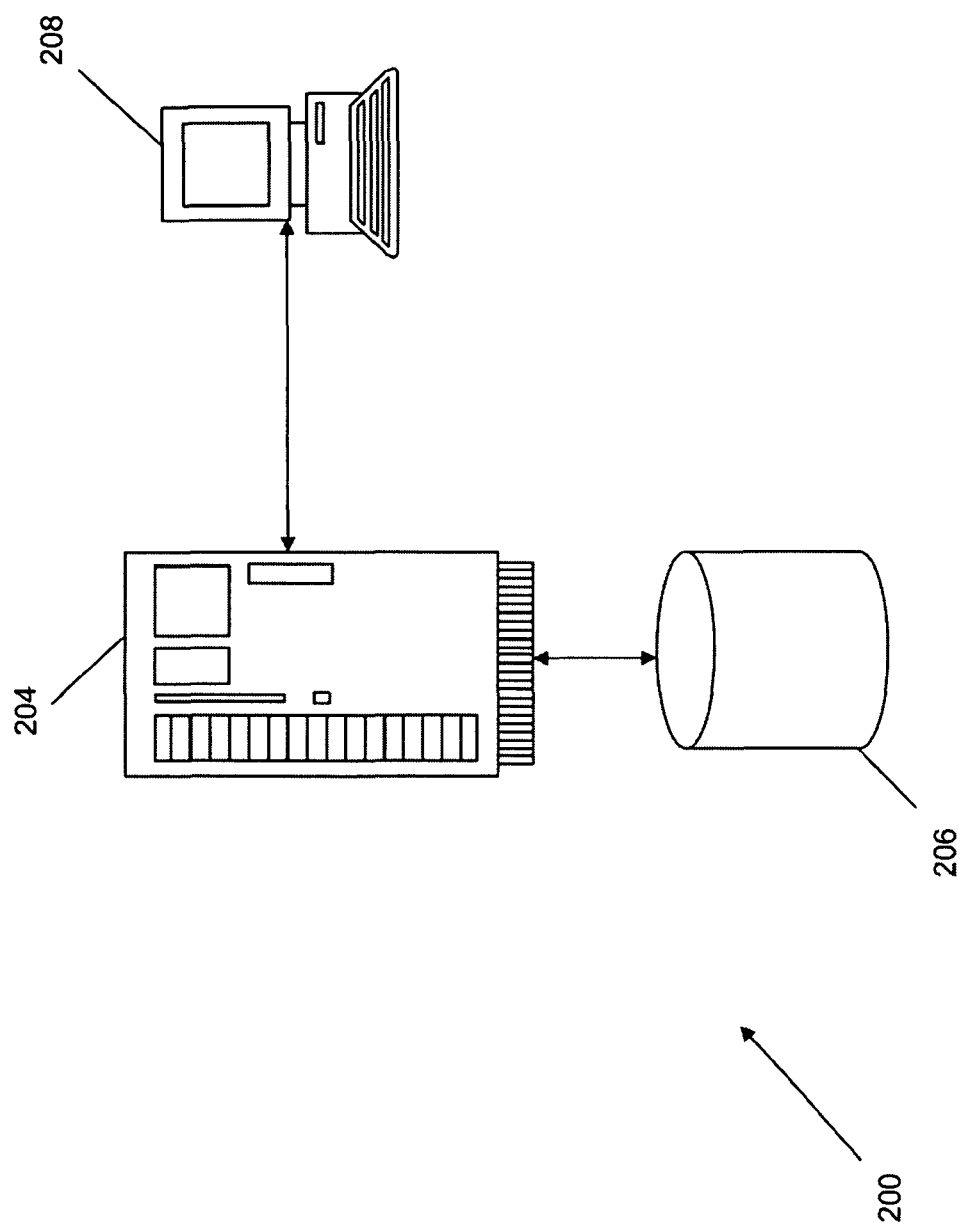

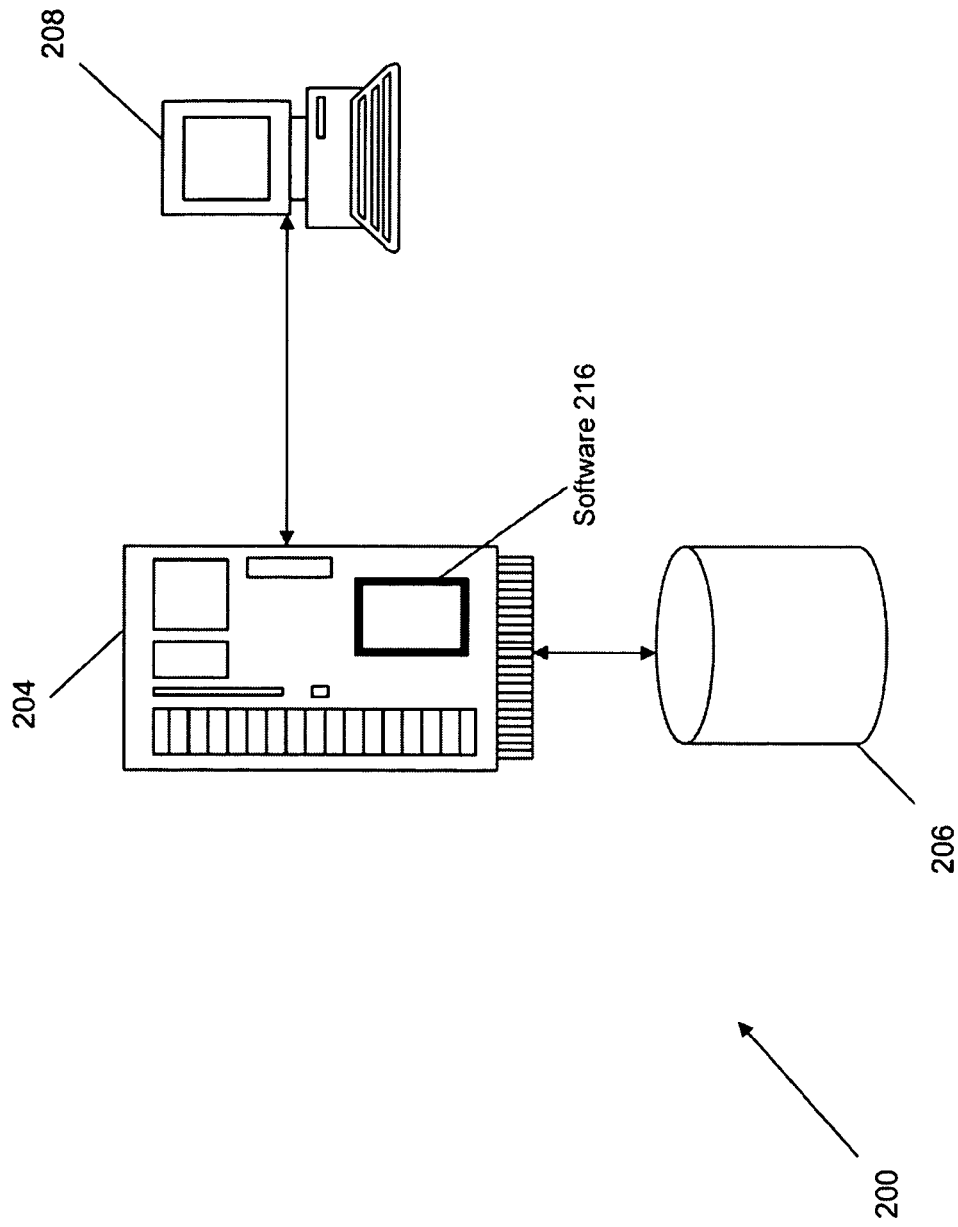

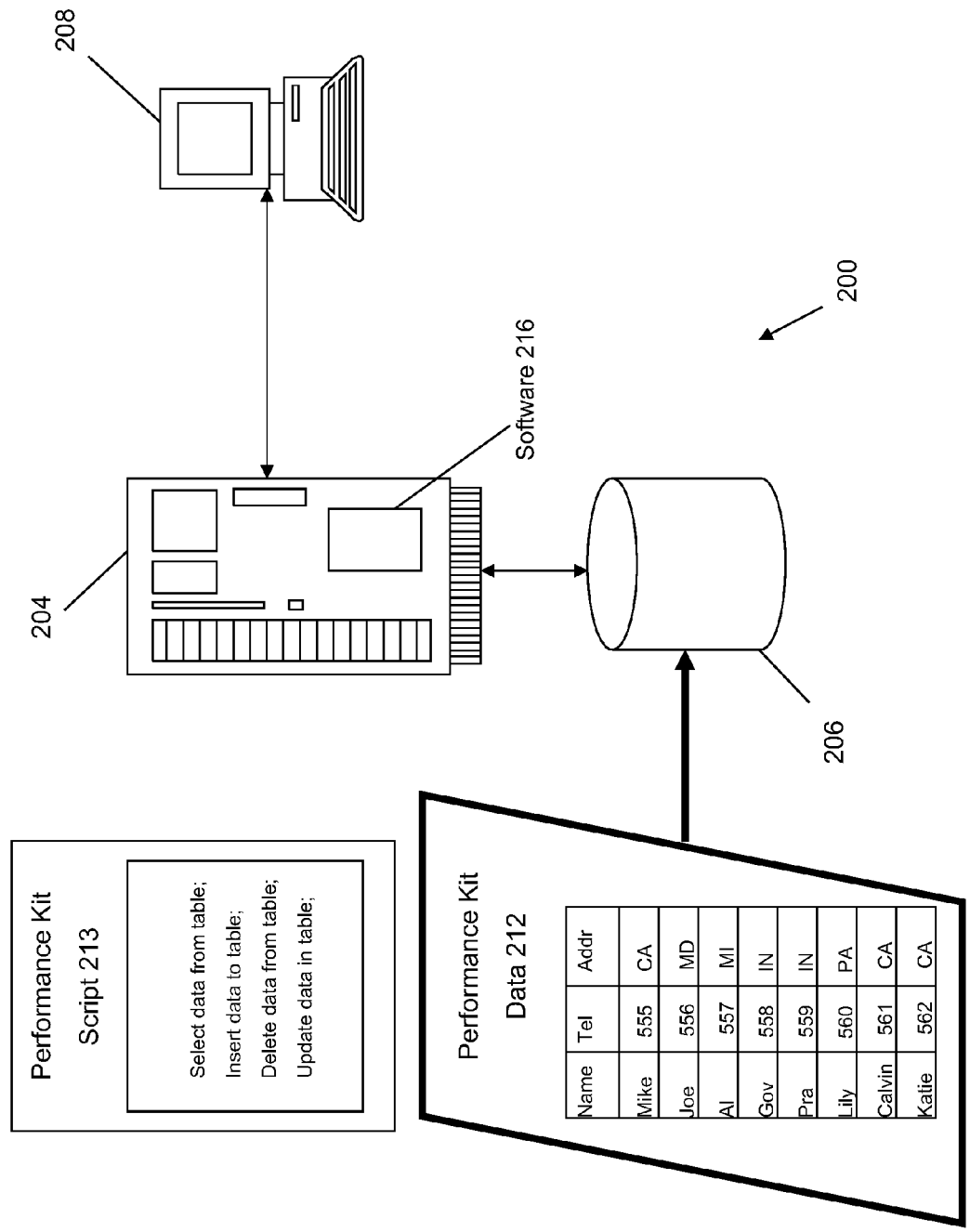

METHOD AND SYSTEM FOR IMPLEMENTING PERFORMANCE KITS

BACKGROUND AND SUMMARY

The invention is directed to an approach for implementing performance kits for computing systems.

Many computer software and hardware vendors provide performance kits that are used to test the functionality and performance of computer hardware, software, and software-hardware combinations. For example, a database vendor may provide a performance kit that is used to test and measure the performance of that vendor's database products on various types of computing hardware, data, and/or operating systems.

One purpose of the performance kit is to provide "benchmarks" that can be used to compare one set of hardware/software against another set of hardware/software. In general, a benchmark is the result of running a computer program, or a set of programs, in order to assess the relative performance of the program, the hardware, and/or software/hardware configuration by running a number of standard tests and trials.

Hardware vendors may use the benchmark results during the development and testing phase of computing products. The hardware vendors may also use the benchmark results to compare performance capabilities against the capabilities of rival companies, e.g., for marketing or competitive analysis purposes.

The end customers of the vendors may also wish to obtain and implement performance kits for the products provided by the vendors. There are many reasons for a customer to desire the results of performance testing. For example, the customer may want the performance test to perform "system sizing", to verify the correct set of hardware and software that should be purchased by the customer to handle an anticipated workload. The performance tests and benchmarks may also be used by the customer to implement and optimize configuration settings for the computing system being used by the customer. For example, it is important for a database administrator (DBA) to understand the point at which system resources and performance are and are not adequate to handle different types of workloads. Performance kits may be used by DBAs to obtain this information. Once the DBA has this type of information, the DBA can use that data to determine system bottlenecks that can be corrected to optimize database performance.

Many computing vendors distribute performance kits that a customer will separately obtain and install onto a given software/hardware platform. Currently, however, there is no easy delivery model which can make that performance kit easily and efficiently consumable for the vendors' customers. Instead, the customers must undergo a lengthy and complex integration process to get the performance kit to work in the customer's target environment.

To address this and other problems, the present invention provides an improved approach for implementing and distributing performance kits that avoids the problems of the prior approaches. Other and additional objects, features, and advantages of the invention are described in the detailed description, figures, and claims.

BRIEF DESCRIPTION OF FIGURES

FIGS. 2A-E illustrate a process for implementing an installation image of software with performance kit data according to some embodiments of the invention.

DETAILED DESCRIPTION

Figure 1:
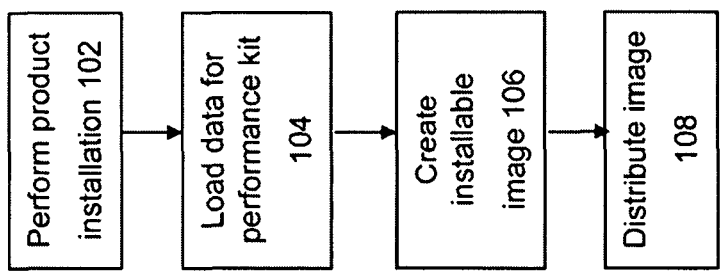
FIG. 1 shows a flowchart of a process for implementing an installation image of software with performance kit data according to some embodiments of the invention.

Embodiments of the present invention provide an improved approach for implementing performance kits. According to some embodiments, test data for the performance kit is preloaded into an installation image that is distributed with a vendor's product. This avoids the need for the customer himself to have to perform the tasks of installing the test data at the customer site.

According to some embodiments, a performance kit comprises a set of test data that is used by a software and/or hardware installation to perform performance testing or benchmarking. The performance kit may also include one or more test programs that use the installation to run against the set of test data. The test programs may be embodied as scripts or executable programs in either interpreted or compiled languages. For the purposes of illustration, embodiments of the present invention will be described by example with respect to these specific types of performance kits. It is noted, however, that the invention may be applied to other types of performance kits and are not to be limited to the exact types of performance kits described here unless claimed as such. In addition, illustrated examples of the invention may be described in the context of performance kits for database applications. The invention, however, is not limited in its application to databases, and indeed, may be employed with any suitable computing product.

As previously noted, many computing vendors deliver performance kits for its customers and downstream vendors. There may be at two parts to the performance kit, including a script portion and a data portion that is operated upon by the scripts. Currently, there does not exist any delivery models which can make both the test data and the script easily or efficiently consumable for users of the performance kits. This is because the consumers of the performance kits must undergo a lengthy and complex integration process to correctly install the test data in the user's environment, particularly when the user's environment may be different from the developer's test environment. As a result, there may be many installation parameters for the test data which are completely incompatible with the user's environment, or which need to be removed or modified before installation into the user's environment. Such parameters include, for example, server names, server settings, and other items which are specific to the application instance where the data backup was taken. Cleaning these items of data is extremely error prone, time consuming, and possibly only performed by limited number of technical specialists familiar with both the test data and the installation environments.

This is even more of an intractable problem when it is considered that the large number of customers may each have an environment that are different from other users, which makes the task of the vendors much more difficult since it will be impossible or impractical for the vendor to be able to predict and pre-address the specific configurations and environment of any given customer.

Embodiments of the present invention address these problems by removing the requirement for the customer to separately install the performance kit data after installation of the underlying computing product. Instead, the performance kit data is installed automatically or at the same time during the install of the underlying product being tested. This is accomplished by creating an installation image for the computing product to be distributed to customers that already includes the performance kit data. In this way, when the product is installed using the installation image, the performance kit data is installed as well.

FIG. 1 shows a flowchart of a process for implementing an installation image of software with performance kit data according to some embodiments of the invention. The process begins by performing a conventional product installation upon a target computing platform (102). This results in the installation of a running version of the software product upon the selected computing platform.

Next, the test data for the performance kit is loaded (104). The test data is based upon the type of test data that would otherwise be loaded as part of a performance kit by the customer. There are many versions of test data that may be utilized in the performance kits. For example, there may be different versions of test data that are specific to different workload levels—a test designed for higher workload tests may use different and/or greater quantities of data as compared to lower workload tests. The test data that is selected at this point is the test data that is appropriate for the specific computing platform being loaded upon and for the corresponding workload of interest.

Once the test data has been loaded, and verified that it has been properly installed, an installable image is created of the system (106). An installation package is created that includes the original software product as well as the test data that is installed with that software package. Any suitable approach can be used to generate the installation image.

Figure 5:
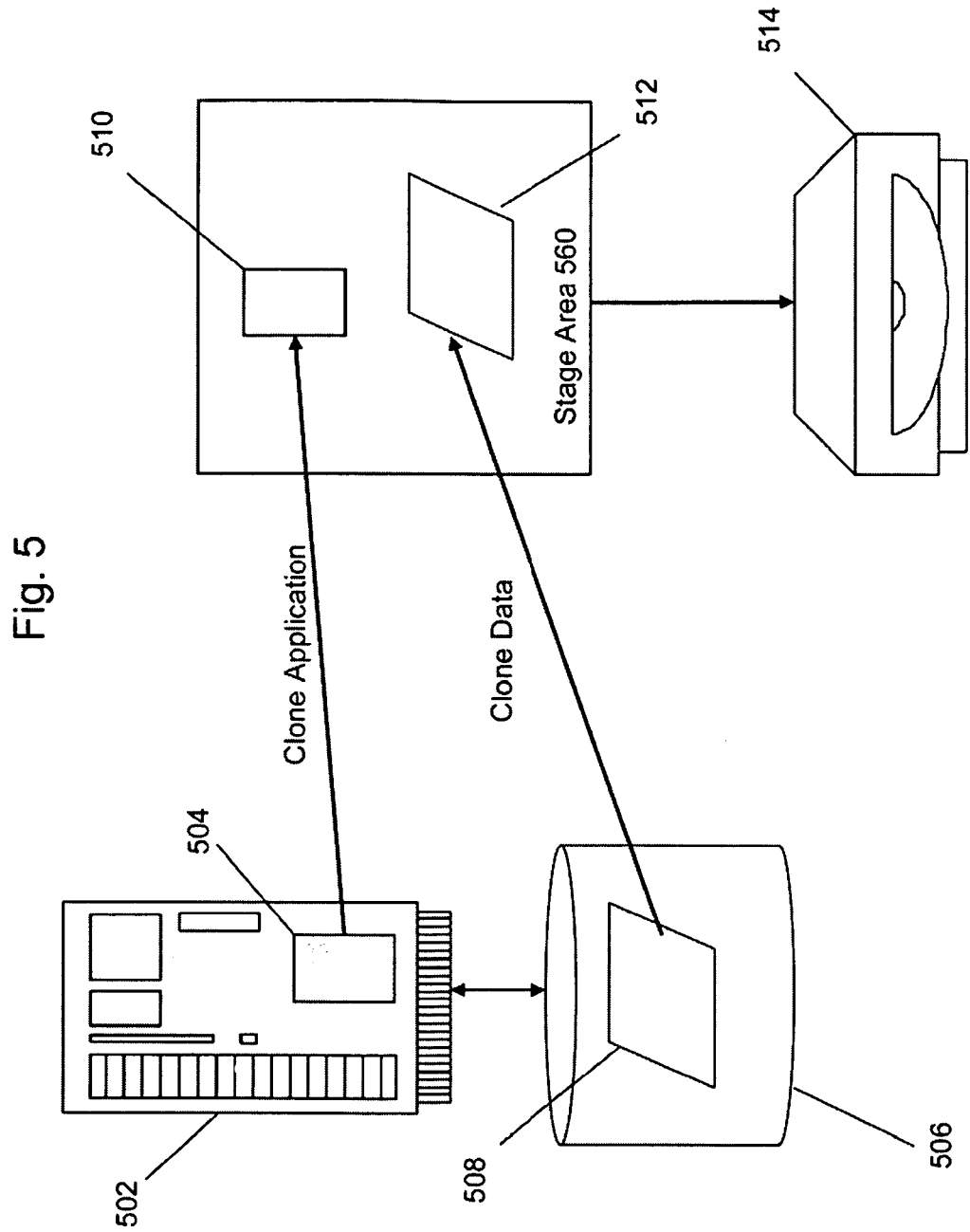
FIG. 5 illustrates a process for generating an installation image according to some embodiments of the invention.

FIG. 5 illustrates one example approach for generating an installation image. This figure shows a computing device 502 that has been loaded with a software application 504. A storage device 506 has been installed with data to be operated upon by the software application 504. For example, the software application 504 could correspond to an installed database manager product or application and the data 508 could correspond to a set of database tables operated upon by the database application.

A cloning process is employed to clone both the application software 504 and the data 508 in the storage device 506. The cloning process generates a duplicate of the contents of the original item being cloned. Therefore, the original software application 504 at computing device 502 is cloned by generating a duplicate of its contents at cloned application 510 at a stage area 560. Similarly, the original data 508 loaded at storage device 506 is cloned by duplicating its contents at cloned data 512 within stage area 560.

The cloned materials are used to create an installable image which will have the software and the data needed for performance kit. For example, the cloned application 510 and cloned data 512 can be burned to a CD or DVD device using a burning device 514. The installation package/image is then tested by performing an install upon one or more sample computing platforms. Once the installation image/package has been adequately tested, the installable image is then distributed to customers (108 of FIG. 1).

Figure 2B:
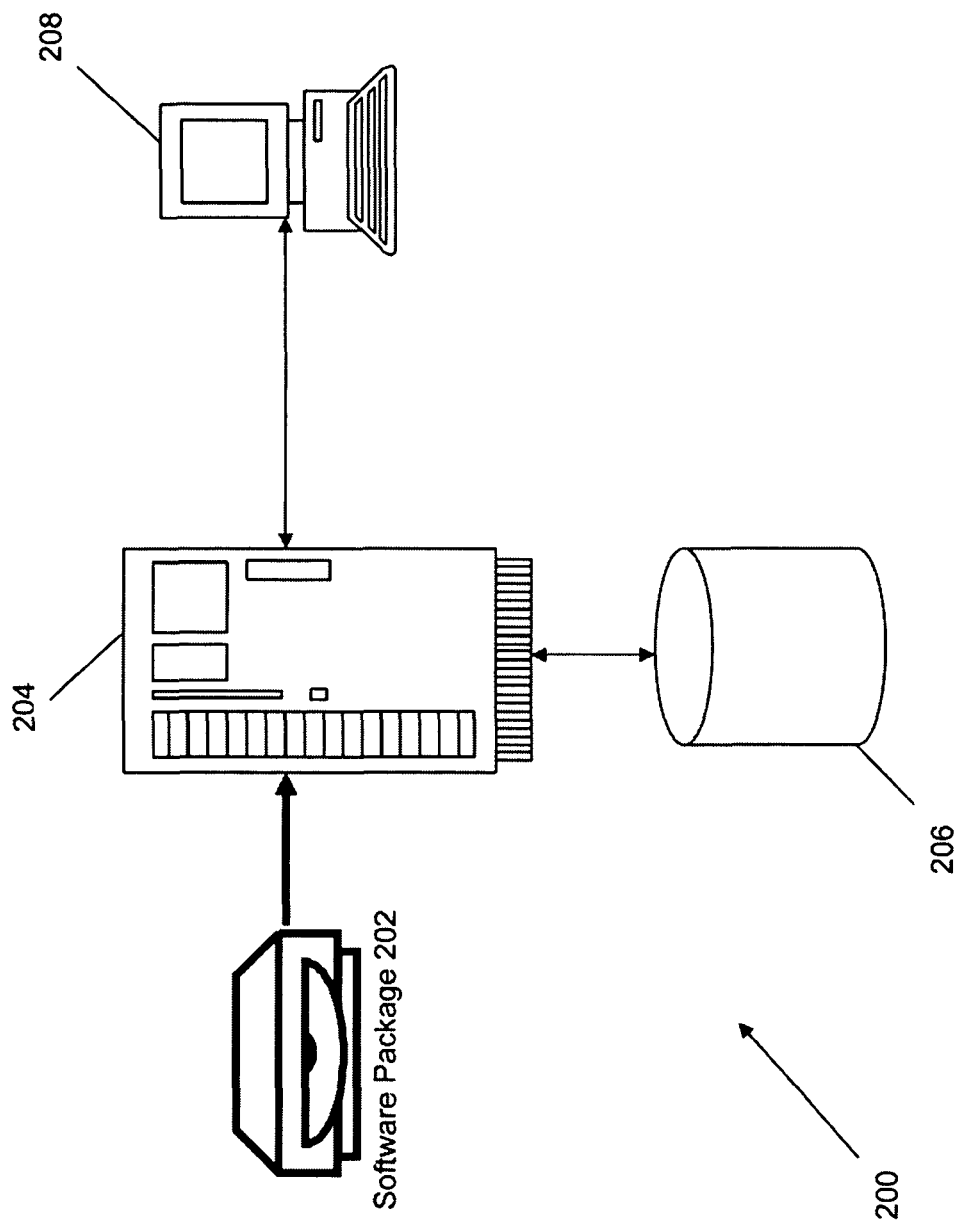

FIGS. 2A-E provide an illustrative example of the process of FIG. 1. FIG. 2A shows an example system 200 that can be used to create an installation image for performance kits. System 200 includes a computing device 204 and a storage device 206. The computing device 204 is of a type that is suitable for loading the intended software application with which the performance kit is employed. In the case of a database product, the computing device 204 comprises a server machine that is suitably configured such that it is able to be loaded with a database management system. One or more users may be able to access the computing device 204 either directly through input devices attached to the computing device 204, or using one or more remote workstations or terminals 208.

Turning to FIG. 2B, the next action is to install a software package 202 onto the computing device 204. The process of installing software package 202 onto computing device 204 can be performed using any suitable or conventional approach. However, it is noted that the software package 202 may exist in many different versions. For example, the software package 202 may have a different version for each type of operating system and/or hardware platform corresponding to the computing device 204. Therefore, there may be a first version of software package 202 that is specific to the LINUX operating system for a first processor type, a second version specific to the LINUX operating system for a second processor type, a third version for another type of operating system on another processor type, etc. Therefore, the specific version of the software package 202 selected for installation must be appropriate for the intended platform.

The result of loading software package 202, as shown in FIG. 2C, is an installed, working version of the software 216 onto the computing device 204. Configuration settings and operating parameters may also be configured for the software 216 to be fully loaded onto computing device 204.

Next, at FIG. 2D, a set of performance kit data 212 is selected to be loaded onto the system 200. For example, if software 216 is a database management system (DBMS) product, then the performance kit data 212 may be composed of one or more database tables to be installed onto a database that has been configured for storage on storage device 206. Part of the process of installing the performance kit data is to adequately configure metadata in the installed database management system such that the correct table structures (e.g., column set-up parameters) are configured for installation of the data.

The performance kit data 212 is configured to be used in conjunction with a performance kit script 213 that performs computing operations upon the performance kit data 212. FIG. 2D is illustrated by way of example with a database-centric script that performs database-related operations upon the performance kit data 212. It is noted, however, that script 213 is not limited to database-only scripts, and may be embodied as any approach for implementing or performing a business flow. For example, the workload to be tested for benchmarked may be a business flow which is simulated or emulated from a front end performance/load-testing tool, such as the LoadRunner tool available from Hewlett-Packard Corporation.

Once the system 200 has been configured with a working version of the software 216 and performance kit data 212, testing may occur to make sure that all required components and data has been properly loaded. The performance kit script 213 may be run at this point against the performance kit data 212 verify proper operation of the software 216.

Figure 2E:
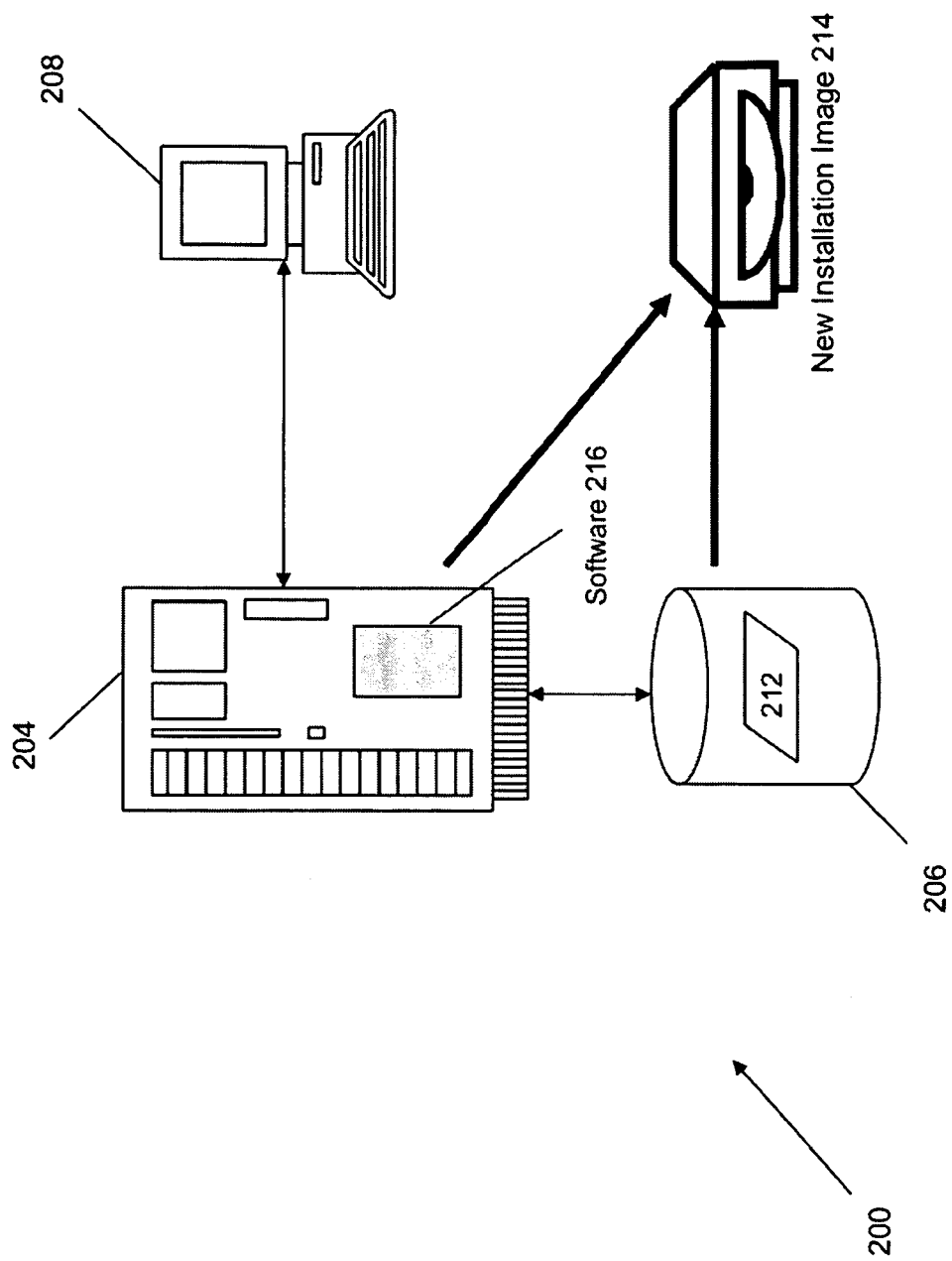

A new installation image 214 is then generated based upon the software 216 and performance kit data 212 that now exists in system 200, as shown in FIG. 2E. Any suitable approach may be taken to generate the installation image. For example, an installer program may be used to create an installable package that includes the software 216, performance kit data 212, and to also set appropriate configuration settings. For database application, the installation image will include adequate configuration information to allow set-up of database tables that make up the performance kit data. This means, for example, that installation of the installation image will also involve set-up of metadata in the database data dictionary sufficient to support the performance kit data in any specified tables.

Any type of performance kit can be implemented using the presently described embodiments. One example application of the present invention is to facilitate performance kits for database-related applications, such as applications that involve OLTP and Batch transactions spanning database applications. Examples of database application that can be used in conjunction with such performance kits include: general ledger, accounts payable, accounts receivable, purchasing, inventory, order management, fixed assets, shipping, human resources, service, sales, and marketing applications. Some goals of such performance kits are to provide a feedback mechanism for application development teams, to allow hardware vendors to evaluate the application on their platforms and provide that information to their customer base, and to increase the collateral available to customers interested in sizing their application configurations.

Figure 6:
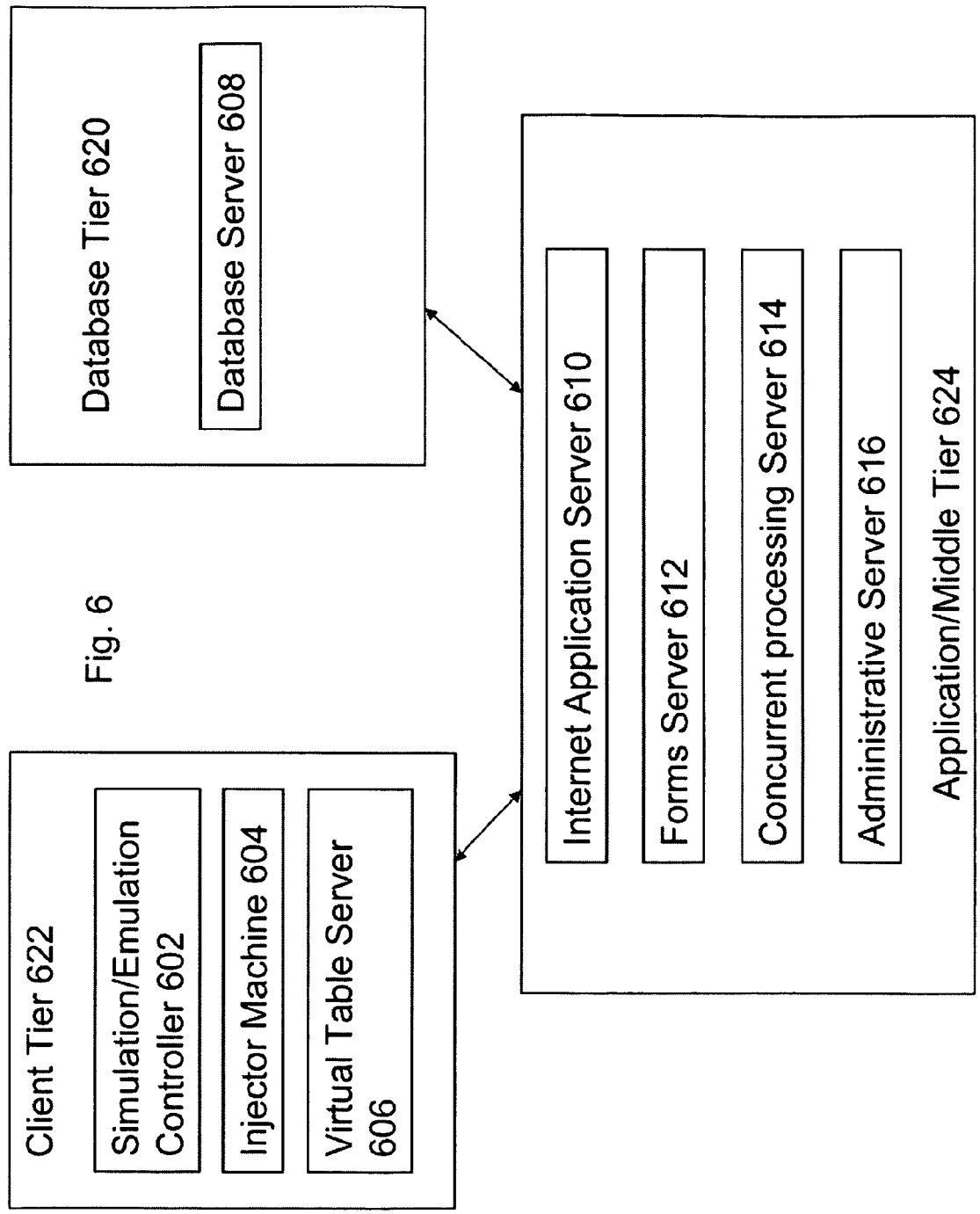
FIG. 6 illustrates an example architecture to which some embodiments of the invention may be applied.

FIG. 6 shows an architecture of a multi-tier database application with which these database applications may be implemented. Therefore, a performance kit will likely have a technology stack that includes data corresponding to some or all of the components of this architecture. In particular, the client tier 622 of the architecture comprises a simulation/emulation controller 602 (such as the Loadrunner product), an injector machine 604, and a virtual table server 606. The application tier 624 comprises an internet application server 610, a forms server 612, a concurrent processing server 614, and an administrative server 616. The database tier 620 comprises the database server 608, such as Oracle 11G product available from Oracel Corporation of Redwood Shores, Calif., USA.

The first order results of the performance kit testing are user count and average response time for a given run. It is possible that hardware vendors will optimize results by iteratively increasing user counts for each run of the benchmark until unacceptable response time is observed. The audit process can be configured to required that each user process executes a minimum number of transactions per user per hour. In this way, the workload does not change as the user count or system load is varied.

The test data for the performance kit can be configured to represent a mixed workload intended to model the most commonly used application business flows and their most commonly used transactions, both for online and batch mode flows. Therefore, the benchmark data is a mix of forms-based and web-based transactions and comes in both OLTP (on-line transaction processing) and batch configurations. The OLTP mix may have its own batch components. The batch component of the OLTP load can scale up in size as users are added such that the overall workload mix stays constant across varying user counts.

The OLTP workload can be configured of any suitable or desired business transaction. For example, for an accounts payable application, the workload can include tests and corresponding data to create a trade invoice for a purchase order, perform an invoice distributions inquiry, or perform an invoice inquiry. For an accounts receivable application, the workload can include tests and corresponding data to perform manual invoice creation, transfer data top a general ledger application, perform an auto-post, generate a customer summary, or perform an aging bucket report. For a fixed assets application, the workload can include tests and corresponding data to perform an asset entry or inquiry. For a general ledger application, the workload can include tests and corresponding data for performing a journal entry or account inquiry. For an expensing application, the workload can include tests and corresponding data to perform cash expense entry, credit card expense, or to query a web expense. For a human resources and payroll application, the workload can include tests and corresponding data perform an employee payslips query. For an order management application, the workload can include tests and corresponding data to perform an order insertion, order booking, or to prepare an order summary report. For a shipping application, the workload can include tests and corresponding data for a shipping confirmation, pick release, or interfaced trip stops. For a purchasing application, the workload can include tests and corresponding data to create a purchase order, to approve a purchase order, to view a purchase order, or to generate purchase order reports. For a sales management application, the workload can include tests and corresponding data to create leads entries, create opportunities entries, create order entries, and to generate a forecast report.

To perform these test workloads in the performance kit, the corresponding test data should be loaded onto the computing devices. The test data is installed, according to the present embodiment, by ensuring that the data is concurrently installed with the application software. This is implemented by loading the test data onto the installation image. Such test data includes order management data such as items, autoship, subinventory, and pickrelease rules data. The number of items will depend upon the expected workload. For example, in one embodiment, if the expected configuration is for a small workload, then 100,000 items are created. For medium workloads, 500,000 items are created. For large workload, 1,000,000 items are created. Test data for a general ledger application include timecard, manager, and employee data. Other items of test data to be loaded for various sales and order applications include credit card data, supplier data, category data, and customer data.

It is noted that the above descriptions of example applications and workload are illustrative, and merely describe examples of data and workloads usable in conjunction with the invention. The invention may be practiced with any workload and test data, and is not limited to the foregoing examples.

Figure 3:
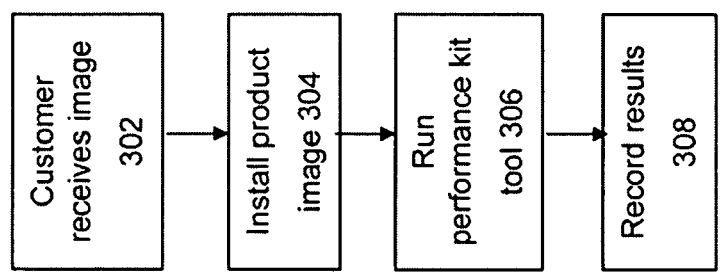
FIG. 3 shows a flowchart of a process for installing and using performance kit data according to some embodiments of the invention.

FIG. 3 shows a process for installing and using the installation image according to an embodiment of the invention. At 302, the customer receives the installation image 214 that includes the performance kit data 212. The installation image 214 is distributed to customers instead of the original installation package 202. At 304, the customer installs the installation image 214 using any suitable or conventional install process. For example, an installer program may be used to install the installation image.

After the installation image 214 has been fully installed, the performance kit data 212 will also have been fully installed as well since it is part of the installation image. For example, if the installation image 214 is for a DBMS installation, then performance kit data 212 in the form of one or more database tables will be installed within the database.

At this point, at 306, the installation kit can be executed upon the performance kit data. If the performance kit contains a performance kit script 213, then the script is executed upon the performance kit data at 306. Test/benchmark results can be recorded at 308. The test/benchmark results can be stored in a computer readable medium or displayed to one or ore users on a display device.

Figure 4A:
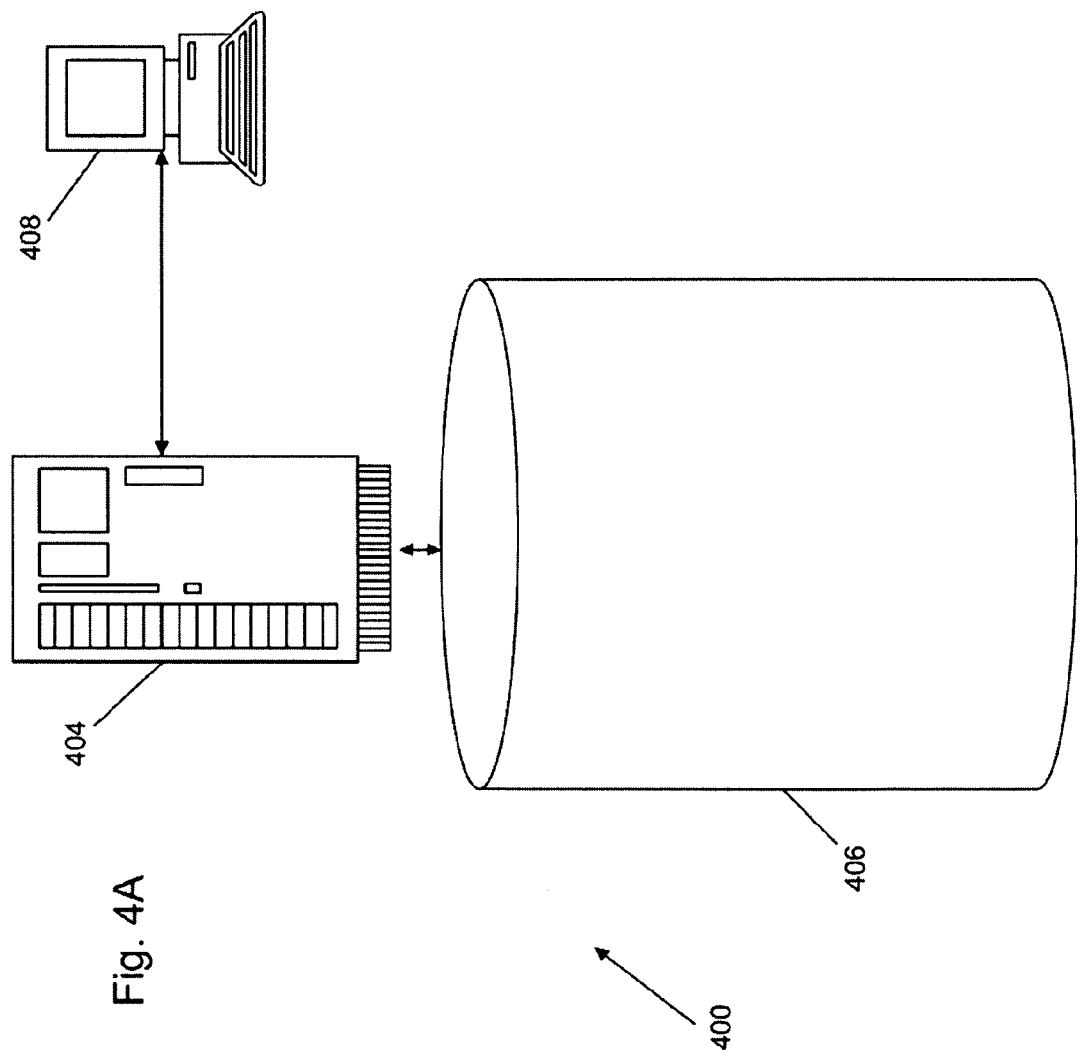
FIGS. 4A-E illustrate a process for installing and using performance kit data according to some embodiments of the invention.
Figure 4B:
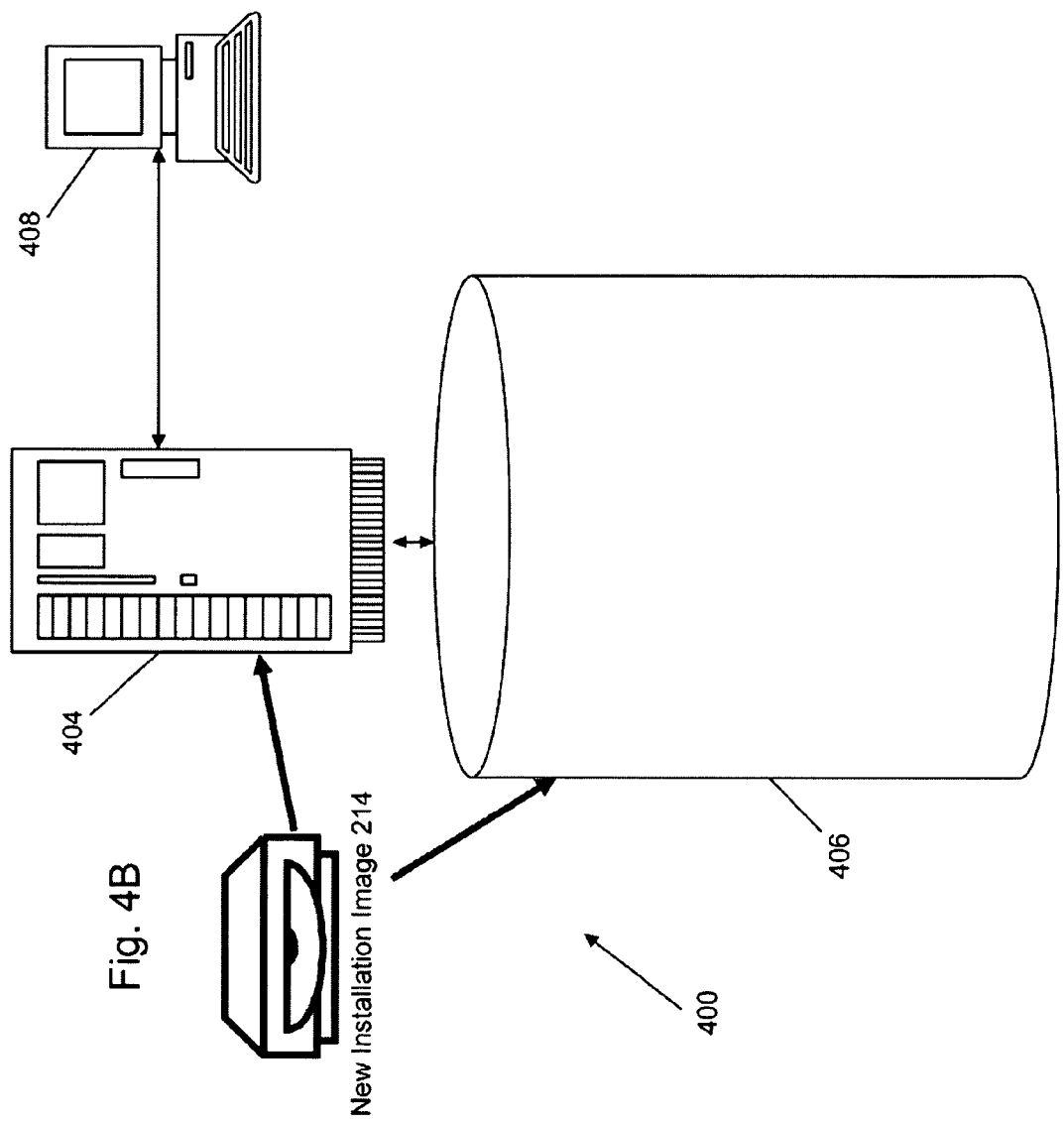

FIGS. 4A-E provide an illustrative example of this process. FIG. 4A shows an example system 400 that can be used to install the software package. System 400 includes a computing device 404 and a storage device 406. One or more user stations or terminals 408 are communicatively connected to the computing device 404. The computing device 404 is of a type that is suitable for running the install image 214 (FIG. 4B) for the intended software application 414 with which the performance kit is employed. The intended software application 414 is very likely configured to be run on a particular combination of operating system and hardware platform. Therefore, the computing device 404 should include the appropriate operating system and hardware configurations suitable for the software application 414.

Figure 4C:
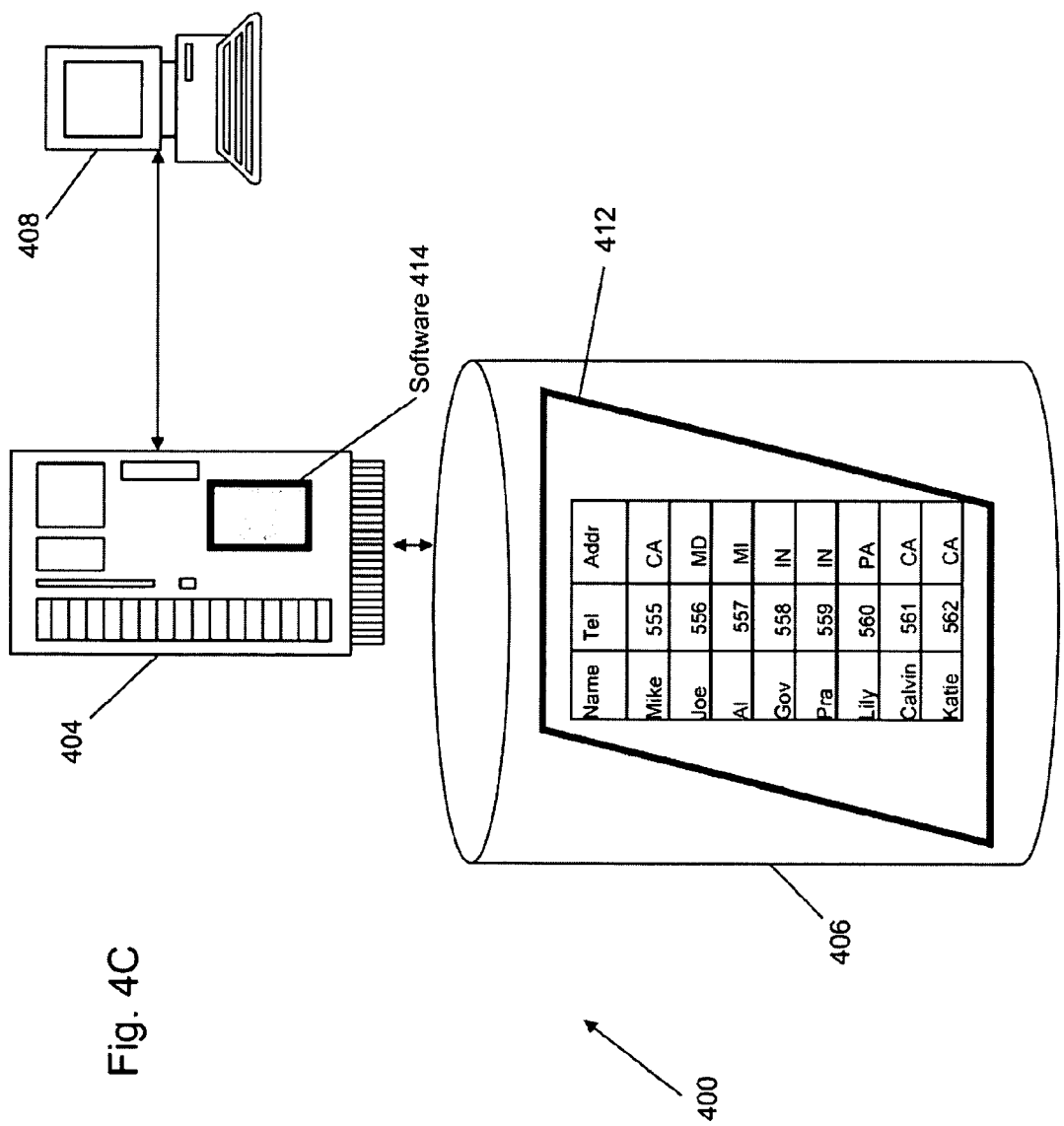

As noted above, the installation image 214 includes both the software application 414 as well as the performance kit data 412. Therefore, running an install program to installation image 414 will result in the installation of both the software application 414 and the performance kit data 412, as shown in FIG. 4C. For example, assuming that the software application 414 is a DBMS, then the DBMS software will be installed and the performance kit data in the form of one or more database tables will also be installed.

Figure 4D:
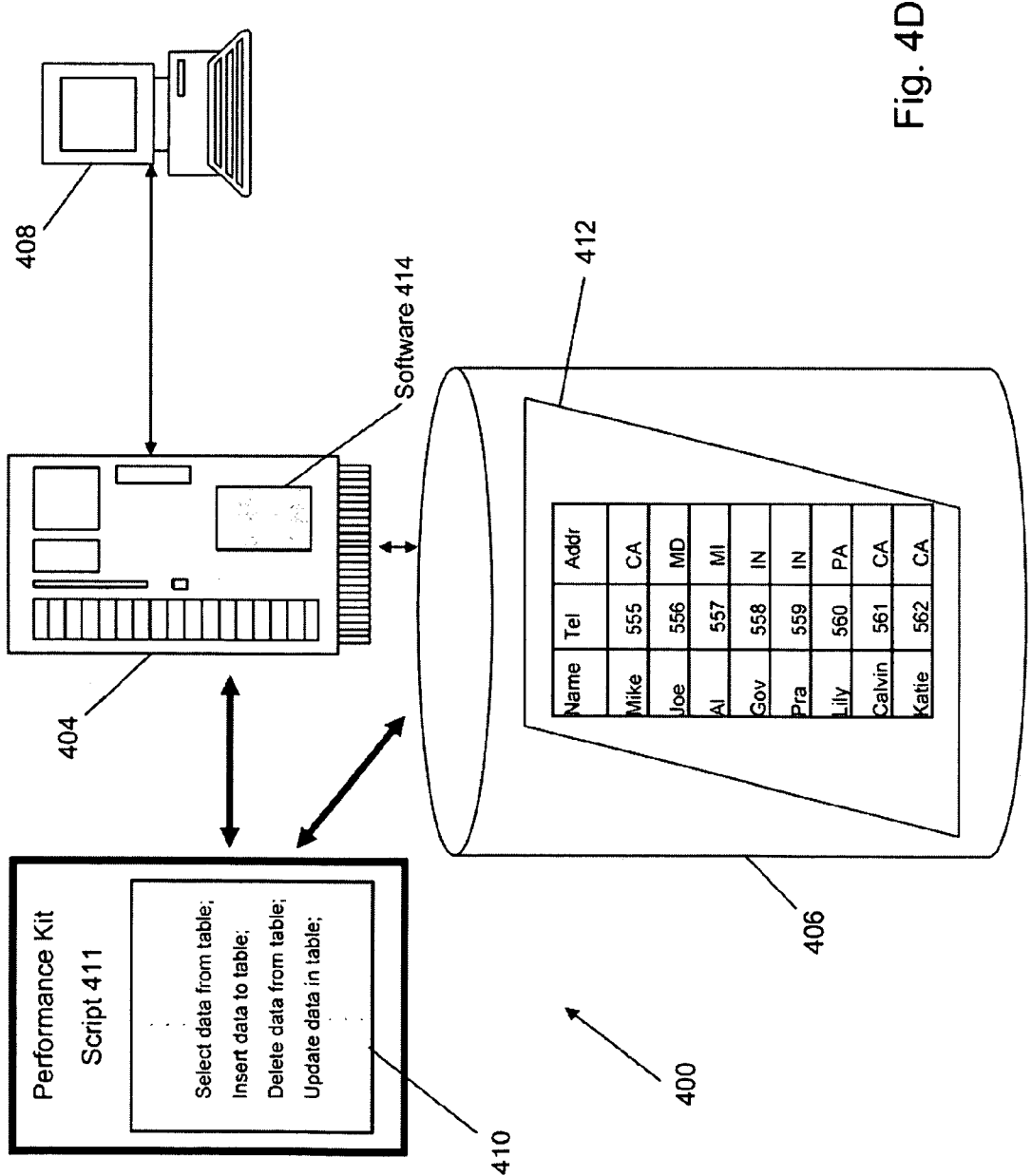

Since the performance kit data has been installed, a performance kit 411 can then be executed to test the software application 414 on system 400, as shown in FIG. 4D. The performance kit 411 in the illustrated example comprises a script 410 that is configured to execute operations in the software application 414 against the performance kit data 412.

Figure 4E:
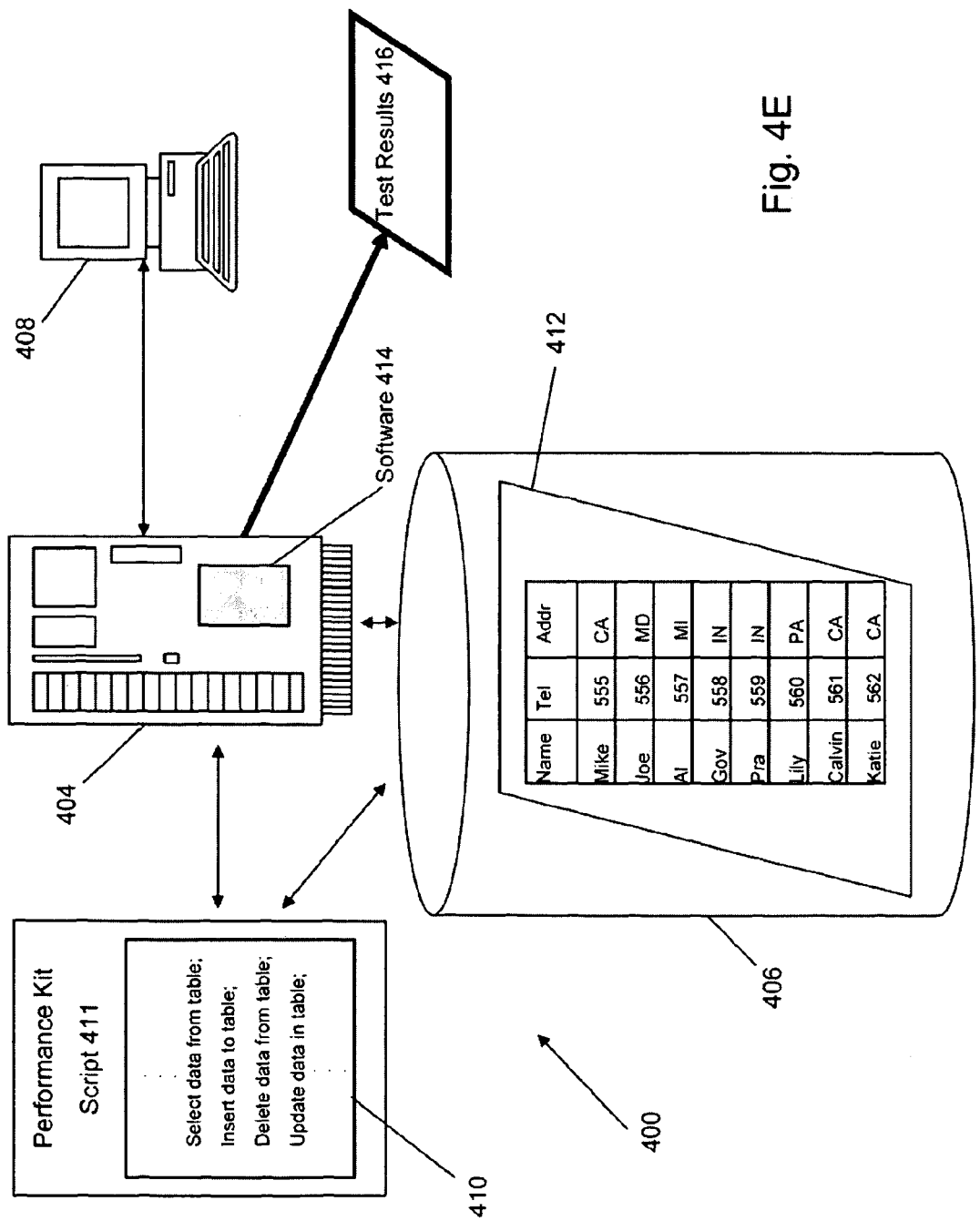

Thereafter, as shown in FIG. 4E, performance results 416 from executing the script 410 are collected. The performance results 416 may be used for many purposes. For example, hardware vendors may use the performance results for competitive analysis purposes or publish the results for marketing purposes. DBAs may use the performance results 416 to optimize or tune the system 400.

For the vendor's customers, there are numerous advantages to the present approach of installing the performance kit data as part of the installation image for the underlying software application. One great advantage is that this approach significantly reduces the amount of error introduced into the system as compared to approaches that require the user themselves to separately and manually install the performance kit data after installing the software application. Moreover, this approach will reduce the amount of effort needed to install performance kit data and to run performance tests. Another advantage is that the present inventive approach either reduces or completely eliminates any manual steps that may be required to load performance kit data.

There are also many advantages to the present approach for the software manufacturer. For example, the present approach provides a one time investment to convert the test data to an installable version. This provides an easily consumable set of performance kit data for customers that is also easy to package. This approach also allows the manufacturer to create and ensure more consistent installs across all customers.

SYSTEM ARCHITECTURE OVERVIEW

Figure 7:
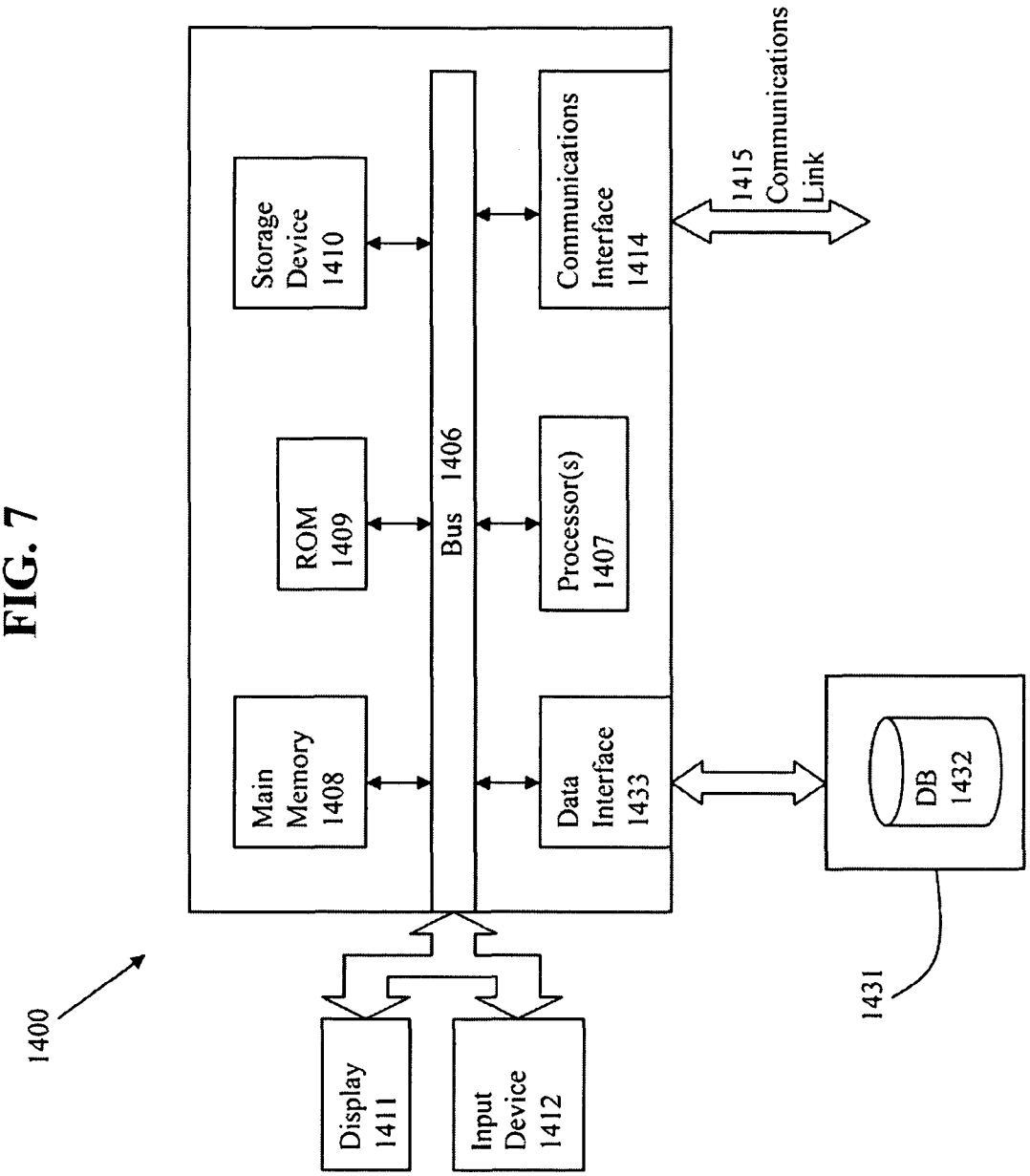
FIG. 7 shows an architecture of an example computing system with which the invention may be implemented.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A method for installing performance kit data to test a performance capability of a software application, comprising:
composing the performance kit comprising one or more scripts and performance kit data having one or more database tables installed onto a database to be operated upon by at least one of the scripts;
configuring metadata in a data dictionary of the database;
distributing a software package comprising an installation image to a computing system for installation upon the computing system, in which the software package comprises a software application and the performance kit, and the performance kit data comprises data used by a performance kit to test the performance capability of the software application; and
installing the software package upon the computing system, wherein the installation of the software package upon the computing system correspondingly causes installation of the performance kit data onto the computing system, and a first script of the scripts verifies operations of the software application are proper after the installation of the installation image upon the computing system.

2. The method of claim 1 in which the software application comprises a database product.

3. The method of claim 1 further comprising installation of a performance kit on the computing system, wherein the performance kit performs computing operations upon the performance kit data.

4. The method of claim 1 in which the software application comprises at least one of the following database applications: general ledger, accounts payable, accounts receivable, purchasing, inventory, order management, fixed assets, shipping, human resources, service, sales, or marketing.

5. The method of claim 1 in which the performance kit data corresponds to data for multiple tiers of an n-tier computing architecture.

6. A method for generating performance kit to test a performance capability of a software application, comprising:
composing, for the software application, the performance kit comprising one or more scripts and performance kit data including one or more database tables installed onto a database to be operated upon by at least one of the scripts;
configuring metadata in a data dictionary of the database;
creating and distributing a software package comprising an installation image to a computing system for installation upon the computing system, wherein
the installation image comprises both the software application and the performance kit data to test the performance capability of the software application, and
a first script of the scripts verifies operations of the software application are proper after the installation of the installation image upon the computing system; and
installing a software application on a computing system to load the performance kit data on the computing system.

7. The method of claim 6 in which the software package further comprises configuration settings for the computing system.

8. The method of claim 6 in which multiple version of the performance kit data exists, and the performance kit data selected for the software package is specific for a given workload.

9. The method of claim 6 in which the software application comprises a database application.

10. The method of claim 9 in which the software package comprises set-up parameters for metadata for the database application.

11. The method of claim 6 in which the software application comprises at least one of the following database applications: general ledger, accounts payable, accounts receivable, purchasing, inventory, order management, fixed assets, shipping, human resources, service, sales, or marketing.

12. The method of claim 6 in which the performance kit data corresponds to data for multiple tiers of an n-tier computing architecture.

13. A computer program product that includes a non-transitory computer readable medium, the non-transitory computer readable medium comprising a plurality of computer instructions which, when executed by a processor, cause the processor to execute a process for installing performance kit data to test a performance capability of a software application, the process comprising:
composing the performance kit comprising one or more scripts and performance kit data including one or more database tables installed onto a database to be operated upon by at least one of the scripts;
distributing a software package comprising an installation image to a computing system for installation upon the computing system, in which the software package comprises a software application and the performance kit, and the performance kit data comprises data used by a performance kit to test the performance capability of the software application;
installing the software package upon the computing system, wherein the installation of the software package upon the computing system correspondingly causes installation of the performance kit data onto the computing system, and a first script of the scripts verifies operations of the software application are proper after the installation of the installation image upon the computing system; and
configuring metadata in a data dictionary of the database.

14. The computer program product of claim 13 in which the software application comprises a database product.

15. The computer program product of claim 13 further comprising installation of a performance kit on the computing system, wherein the performance kit performs computing operations upon the performance kit data.

16. A computer program product that includes a non-transitory computer readable medium, the non-transitory computer readable medium comprising a plurality of computer instructions which, when executed by a processor, cause the processor to perform a process for generating performance kit data to test a performance capability of a software application, the process comprising:
composing, for the software application, the performance kit comprising one or more scripts and performance kit data including one or more database tables installed onto a database to be operated upon by at least one of the scripts;
configuring metadata in a data dictionary of the database; and
creating and distributing a software package comprising an installation image to a computing system for installation upon the computing system, wherein
the installation image comprises both the software application and the performance kit data to test the performance capability of the software application, and a first script of the scripts verifies operations of the software application are proper after the installation of the installation image upon the computing system; and installing a software application on a computing system to load the performance kit data on the computing system.

17. The computer program product of claim 16 in which the software package further comprises configuration settings for the computing system.

18. The computer program product of claim 16 in which multiple versions of the performance kit data exists, and the performance kit data selected for the software package is specific for a given workload.

19. The computer program product of claim 16 in which the software application comprises a database application.

20. The computer program product of claim 19 in which the software package comprises set-up parameters for metadata for the database application.

21. A system for installing performance kit data to test a performance capability of a software application, comprising:

means for composing the performance kit comprising one or more scripts and performance kit data having one or more database tables installed onto a database to be operated upon by at least one of the scripts;

means for configuring metadata in a data dictionary of the database;

means for distributing a software package to a computing system for installation upon the computing system, in which the software package comprises a software application and the performance kit, and the performance kit data comprises data used by a performance kit to test the performance capability of the software application; and means for installing the software package upon the computing system, wherein the installation of the software package upon the computing system correspondingly causes installation of the performance kit data onto the computing system, and a first script of the scripts verifies operations of the software application are proper after the installation of the installation image upon the computing system.

22. The system of claim 21 in which the software application comprises a database product.

23. The system of claim 21 further comprising installation of a performance kit on the computing system, wherein the performance kit performs computing operations upon the performance kit data.

24. The system of claim 23 in which the performance kit comprises a script to perform the computing operations.

25. A system for generating performance kit data to test a performance capability of a software application, comprising:

means for composing, for the software application, the performance kit comprising one or more scripts and performance kit data including one or more database tables installed onto a database to be operated upon by at least one of the scripts;

means for configuring metadata in a data dictionary of the database;

means for creating and distributing a software package comprising an installation image to a computing system for installation upon the computing system, wherein the installation image comprises both the software application and the performance kit data to test the performance capability of the software application, and a first script of the scripts verifies operations of the software application are proper after the installation of the installation image upon the computing system; and means for installing a software application on a computing system to load the performance kit data on the computing system.

26. The system of claim 25 in which the software package further comprises configuration settings for the computing system.

27. The system of claim 25 in which multiple version of the performance kit data exists, and the performance kit data selected for the software package is specific for a given workload.

28. The system of claim 25 in which the software application comprises a database application.

29. The system of claim 28 in which the software package comprises set-up parameters for metadata for the database application.

30. The method of claim 1, wherein the performance kit data comprises test data specific to an on-line transaction processing workload.

31. The computer program product of claim 13, wherein the performance kit data comprises test data specific to an on-line transaction processing workload.

32. The system of claim 21, wherein the performance kit data comprises test data specific to an on-line transaction processing workload.

* * * * *

UNITED STATES PATENT AND TRADEMARK OFFICE
CERTIFICATE OF CORRECTION

PATENT NO. : 8,739,154 B2
APPLICATION NO. : 12/258160
DATED : May 27, 2014
INVENTOR(S) : Thirumalai et al.

Page 1 of 1

It is certified that error appears in the above-identified patent and that said Letters Patent is hereby corrected as shown below:

On title page, column 2, under Other Publications, line 13, Delete "Enfineering" and insert -- Engineering --, therefor.

In the Specification

In column 5, line 43, delete "Oracel" and insert -- Oracle --, therefor.

In column 7, line 6, delete "ore" and insert -- more --, therefor.

In column 8, line 46, delete "PTSN," and insert -- PSTN, --, therefor.

Signed and Sealed this
Nineteenth Day of May, 2015

Michelle K. Lee
*Director of the United States Patent and Trademark Office*

UNITED STATES PATENT AND TRADEMARK OFFICE
CERTIFICATE OF CORRECTION

PATENT NO. : 8,739,154 B2
APPLICATION NO. : 12/258160
DATED : May 27, 2014
INVENTOR(S) : Thirumalai et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1134 days.

Signed and Sealed this
Eleventh Day of August, 2015

Michelle K. Lee
*Director of the United States Patent and Trademark Office*